US011029525B2

(12) United States Patent
Lawrence (10) Patent No.: US 11,029,525 B2
(45) Date of Patent: Jun. 8, 2021

(54) AUTOMATIC SENSOR POSITIONING FOR BIOMETRIC SENSING

(71) Applicant: Intel Corporation, Santa Clara, CA (US)

(72) Inventor: Sean J. W. Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/721,455

(22) Filed: Dec. 19, 2019

(65) Prior Publication Data

US 2020/0124863 A1    Apr. 23, 2020

(51) Int. Cl.
*G02B 27/01* (2006.01)
*G06K 9/00* (2006.01)

(52) U.S. Cl.
CPC ..... *G02B 27/0179* (2013.01); *G02B 27/0149* (2013.01); *G02B 27/0176* (2013.01); *G06K 9/00912* (2013.01); *G02B 2027/0163* (2013.01); *G06K 2009/00939* (2013.01)

(58) Field of Classification Search
CPC ............ G02B 27/0149; G02B 27/0179; G02B 27/0176; G02B 2027/0154; G02B 2027/0163; G06K 9/00912; G06K 2009/00939
See application file for complete search history.

(56) References Cited

U.S. PATENT DOCUMENTS

| 5,812,224 A | * | 9/1998 | Maeda | G02B 27/0176 345/8 |
| 5,880,773 A | * | 3/1999 | Suzuki | G02B 7/12 348/115 |
| 8,553,910 B1 | * | 10/2013 | Dong | H04R 1/1066 381/151 |
| 10,760,931 B2 | * | 9/2020 | Cherkashin | G01D 18/00 |
| 2006/0079792 A1 | * | 4/2006 | Finburgh | A61B 5/681 600/485 |
| 2008/0291277 A1 | * | 11/2008 | Jacobsen | G02B 27/0172 348/158 |
| 2016/0361512 A1 | * | 12/2016 | Lawrenson | A61M 16/0605 |
| 2018/0046147 A1 | * | 2/2018 | Aghara | A61B 5/6803 |
| 2018/0132116 A1 | * | 5/2018 | Shekhar | H04W 24/02 |
| 2019/0030394 A1 | * | 1/2019 | Orr | A63B 21/4005 |
| 2019/0075382 A1 | * | 3/2019 | Schrader | H04M 1/6058 |
| 2019/0167095 A1 | * | 6/2019 | Krueger | A61B 3/112 |
| 2019/0274115 A1 | * | 9/2019 | Kim | H04W 64/003 |
| 2020/0174262 A1 | * | 6/2020 | Godar | G06T 15/205 |

FOREIGN PATENT DOCUMENTS

WO    2018/031209 A2    2/2018

* cited by examiner

*Primary Examiner* — Christopher E Leiby
(74) *Attorney, Agent, or Firm* — Fletcher Yoder, PC (57) ABSTRACT

A method for positioning a sensor configured to receive biometric signals includes receiving a biometric signal using a biometric sensor at a first position, the biometric signal comprising a set of raw biometric signal data. In some implementations, signal analysis is used to determine whether at least one signal criteria is met and to determine whether the biometric sensor is moved from the first position to a second position.

20 Claims, 6 Drawing Sheets

AUTOMATIC SENSOR POSITIONING FOR BIOMETRIC SENSING

BACKGROUND

The present disclosure relates generally to automatic positioning of a sensor to receive biometric signals.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Biometric signals are a set of measurable biological characteristics corresponding to a physical state. Due to differing physical characteristics, the location of an artery and/or other sensing position for a biometric signal may differ between multiple users. As a result, a rigid sensor may not be capable of detecting biometric signals with sufficient quality for every user.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
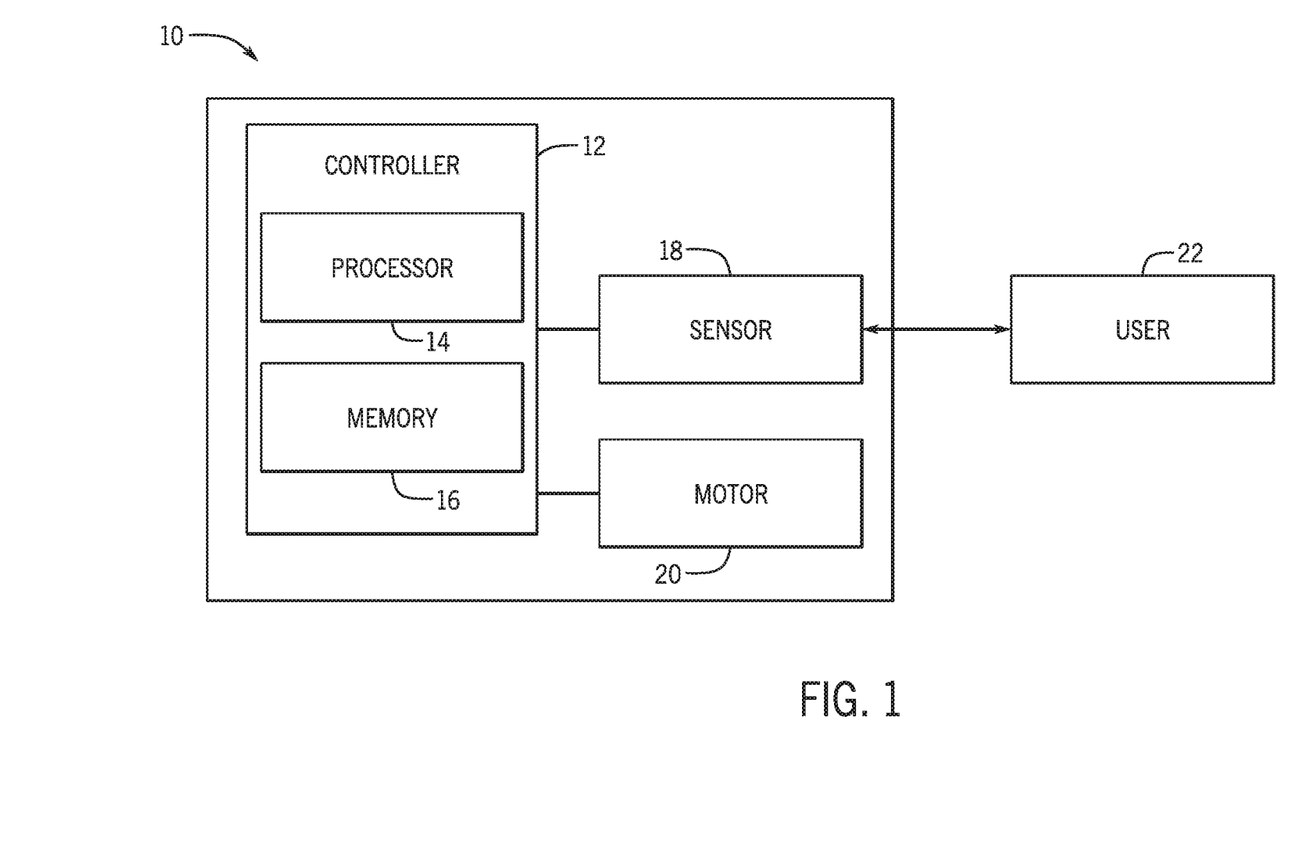
FIG. 1 illustrates a block diagram of a biometric sensor system, in accordance with an embodiment of the present disclosure.

With the foregoing in mind, FIG. 1 is a block diagram of a biometric sensor system 10 that may dynamically position a sensor to detect biometric signals, as described herein. The biometric sensor system 10 may include a system controller block 12. The system controller block 12 may control operation of a biometric sensor 18 and/or motor 20, and may process signal data acquired by the sensor 18. The system controller block 12 may be coupled to the sensor 18 by any suitable techniques for communicating signal data and control signals between the system controller block 12 and the sensor 18, such as a wireless, optical, coaxial, wired, or other suitable connection.

The sensor 18 may be a biometric sensor. The sensor 18 may sense a biometric signal (e.g., heartrate, electrocardiogram (ECG), temperature, photoplethysmogram (PPG), electrodermal activity (EDA), odor) from the user 22. The sensor 18 may contact a user 22 during a sensing period. For example, the sensor 18 may detect a pulse of the user 22. More specifically, the sensor 18 may be an electrode that measures an electrical potential difference in the user 22 (e.g., at a body part of the user 22, such as a head, face, hand, wrist, arm, leg, torso, or chest) and generates raw biometric signal data (i.e., unfiltered signal data having signal and noise components) for transmission to and processing by the system controller block 12. In certain embodiments, the sensor 18 may be a microphone.

The motor 20 may move the sensor 18 by incremental steps in one or more degrees of freedom (e.g., 1, 2, 3, and up to and including 6). More specifically, the motor 20 may move the sensor 18 along three axes of motion. For example, the motor 20 may be capable of moving the sensor 18 in a horizontal direction, a vertical direction, and/or retracting/extending the sensor 18 relative to the user 22.

As will be appreciated, the system controller block 12 may include a number of elements to control operation of the sensor 18, facilitate placement/guidance of the sensor, and facilitate production and/or interpretation of the raw biometric signal data. For instance, as illustrated, the system controller block 12 may include a processor 14 and memory 16.

The processor 18 may instruct the sensor 18 to begin or end a sensing period. Additionally, the processor 14 may process acquired data to determine a noise component and/or a signal component of the biometric signal, compute a signal to noise ratio (SNR) of the biometric signal, and/or may compare the SNR and/or the biometric signal to signal criteria. The processor 14 may include receiving and conversion circuitry. In particular, the processor 14 may receive the biometric signal from the sensor 18 representing electric potential differences within the user 22, and process the biometric signal by, for example, determining a noise component and/or a signal component of the biometric signal.

The processor 14 may compare the biometric signal to one or more expected signals stored in memory, such as memory 16 of FIG. 1. The processor 14 may determine patterns, signatures, or notable components of the biometric signal, and compare these to the one or more expected signals. For example, if the biometric signal corresponds to an ECG signal, the processor 14 may determine regularly occurring peaks of the ECG signal (e.g., that correspond to R peaks (maximum amplitudes following an upward deflection) of the ECG signal). The processor 14 may compare the detected biometric signal or recognizable components of the biometric signal with an expected signal to determine a noise component of the biometric signal. For example, the processor 14 may subtract amplitude values of the expected signal from the detected biometric signal, thereby removing the signal component of the detected biometric signal and leaving the noise component.

In some embodiments, the processor 14 may receive a set of biometric signals from the sensor 18 at a corresponding set of sensor positions (e.g., along one or more body parts of the user 22). The processor 14 may process the set of biometric signals from the sensor 18, such as by determining a noise component and/or a signal component of each of the set of biometric signals. The processor 14 may determine the biometric signal having a greater or maximum SNR from the set of biometric signals. The processor 14 may then instruct the sensor 18 to move to the sensor position corresponding to the biometric signal having the greater or maximum SNR. In this manner, the biometric sensor system 10 may operate with improved and more accurate biometric signal feedback, as the sensor 18 may receive a biometric signal having a greater or maximum SNR.

In certain embodiments, the processor 14 may receive a first biometric signal from the sensor 18 at a first sensor position. The processor 14 may process the first biometric signal, such as by determining a noise component and/or a signal component of the first biometric signal. The processor 14 may compute a SNR of the first biometric signal. The processor 14 may compare the computed SNR of the first biometric signal to a signal criteria, such as a threshold SNR. If the computed SNR meets or exceeds the signal criteria (e.g., threshold SNR), the processor 14 may instruct the motor 20 to hold the sensor 18 at the first sensor position. If the computed SNR fails to meet or exceed the signal criteria (e.g., threshold SNR), the processor 14 may then instruct the motor 20 to move the sensor 18 to a new sensor position. The processor 14 may activate the sensor 18 to begin acquiring biometrical signal data at the new sensor position. The processor 14 may receive a second biometric signal from the sensor 18 at the new sensor position. The processor 14 may process the second biometric signal, such as by determining a noise component and/or a signal component of the first biometric signal. The processor 14 may compute a SNR of the second biometric signal. The processor 14 may compare the computed SNR of the second biometric signal to the signal criteria, such as the threshold SNR. If the second computed SNR meets or exceeds the signal criteria (e.g., threshold SNR), the processor 14 may instruct the motor 20 to hold the sensor 18 at the new sensor position. If the second computed SNR fails to meet or exceed the signal criteria (e.g., threshold SNR), the processor 14 may then instruct the motor 20 to move the sensor 18 to a third sensor position. The processor 14 may continue to instruct the motor 20 to move the sensor 18 to new positions until the threshold SNR is met or exceeded. If the threshold SNR is not met or exceeded, the processor 14 may instruct the motor 20 to move the sensor 18 to a position corresponding to the maximum SNR. In this manner, the biometric sensor system 10 may operate with improved and more accurate biometric signal feedback, as the sensor 18 may be configured to move positions until a biometric signal having an equal or greater SNR than a threshold SNR is received.

The memory 16 may include one or more tangible, non-transitory, computer-readable media that store instruction executable by the processor 14 and/or data to be processed by the processor 14. For example, the memory 16 may include random access memory (RAM), read-only memory (ROM), rewritable non-volatile memory such as flash memory, hard drives, optical discs, and/or the like. Additionally, the processor 14 may include one or more general purpose microprocessors, one or more application specific processors (ASICs), and/or one or more field programmable logic arrays (FPGAs). Further, the memory 16 may store the set of raw signal data obtained via the sensor 18 and/or algorithms utilized by the processor 14 to help guide and/or activate the sensor 18. In some embodiments, the memory 16 may store a set of instructions and/or signal processing algorithms for the processor 14 to perform. In particular, the processor 14 may perform a signal processing algorithm on raw signal data to filter noise from the raw signal data to generate a signal component. For example, the memory 16 may store algorithms to perform Fourier transformations, wavelet transformations, finite impulse response filter, and infinite impulse response filter, among others. In certain embodiments, the system controller block 12 may include additional elements not shown in FIG. 1, such as additional data acquisition and processing controls, display panels, user interfaces, and so forth.

In another embodiment, the biometric sensor system 10 may include a movement sensor that detects a motion of the system 10. For example, the movement sensor may include an accelerometer and/or a gyroscope. For example, the movement sensor may detect the biometric sensor system 10 is moving when a user picks up a head-mounted display incorporating the biometric sensor system 10 to place on the user's head. In response, the movement sensor may output a signal to the processor 14. In response to receiving the signal from the movement sensor, the processor 14 may activate the sensor 18 to begin acquiring biometric signal data.

Figure 2A:
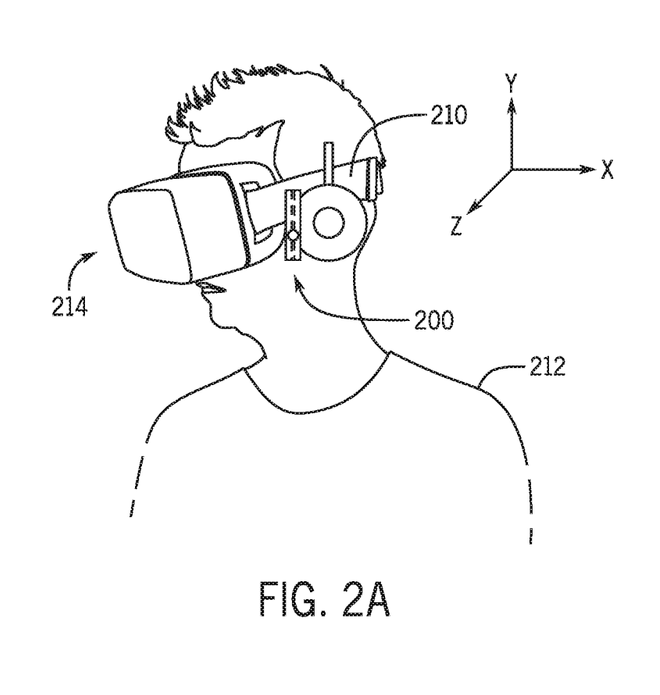
FIGS. 2A and 2B are diagrams of a device incorporating a biometric sensor system on a linear track of a corresponding head-mounted display, in accordance with an embodiment of the present disclosure.
Figure 2B:
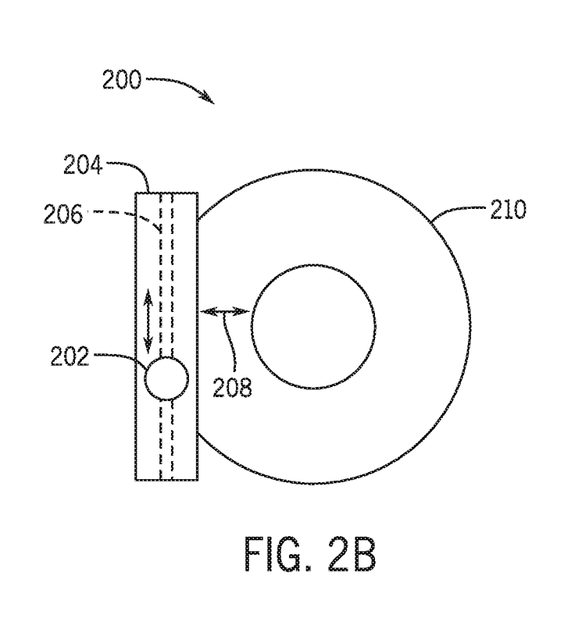

With the preceding in mind, FIGS. 2A and 2B are diagrams of an example of a device 200 incorporating a biometric sensor system, such as biometric sensor system 10 in FIG. 1, having a sensor 202 on a linear track, according to embodiments of the present disclosure. To facilitate discussion related to motion of the sensor 202, an illustration of three axes of motion corresponding to three degrees of freedom with respect to movement of the sensor 202 is shown. The three axes of motion (and corresponding degrees of freedom) may be denoted as horizontal motion (e.g., movement along the x-axis anterior and posterior in relation to the user), vertical motion (e.g., movement along the y-axis inferior and superior in relation to the user), and retraction/extension (e.g., movement along the z-axis towards and away from the user). The three degrees of freedom represent only an example embodiment of motion of the sensor 202. In certain embodiments, more or fewer than three degrees of freedom are possible for the motion of the sensor 202. In some embodiments, the sensor 202 may be configured to move in one or more degrees of freedom. For example, the sensor 202 may be configured to move in six degrees of freedom.

The device 200 may include a sensor 202, a housing 204, a first motion track 206, and a second motion track 208. The sensor 202 may be an example of the sensor 18 in FIG. 1. As such, the sensor 202 may detect a biometric signal from a user 212. In some embodiments, the sensor 202 may retract into the housing 204 away (e.g., along the z-axis) from the user 212. For example, the sensor 202 may retract into the housing 204 before and/or during a horizontal (e.g., along the x-axis) and/or vertical (e.g., along the y-axis) movement of the sensor 202. The sensor 202 may additionally or alternatively extend toward the user 212 before starting and during a sensing period.

The housing 204 may be disposed on a headset housing 210, such as for a head-mounted display (HMD) 214. For example, the housing 204 may be coupled to the headset housing 210. The HMD 214 may be a display device worn on the head of a user and include a display optic in front of either one or both eyes of the user. The HMD 214 may display computer-generated imagery, live imagery, and/or output audio (e.g., associated with imagery). As such, the HMD 214 may include a virtual reality headset, an augmented reality headset, a mixed reality headset, and so on. The headset housing 210 may include one or more straps to support the weight of the HMD 214 on the user's 212 head. In an embodiment, the headset housing 210 may be a component of any suitable device benefiting from biometric data acquired by a biometric signal sensor, such as fitness trackers, activity trackers, and other forms of wearable technology. The first motion track 206 may also be disposed on the housing 204. The first motion track 206 may guide movement of the sensor 202 in a first direction, such as a vertical direction. Additionally or alternatively, the second motion track 208 may be disposed on the housing 204. The second motion track 208 may guide movement of the sensor 202 in a second direction, such as a horizontal direction.

In an embodiment, the first motion track 206 and the second motion track 208 may permit movement of the sensor toward a superficial temporal artery of a user, such as user 22 of FIG. 1. The superficial temporal artery is often located adjacent and anterior to the user's ear. Due to differences in head shapes, dimensions, and other physical characteristics of a user, the location of the superficial temporal artery is not uniform amongst all users. As such, the processor of the device 200 may enable dynamic positioning of the sensor on any user's artery, regardless of physical characteristics, by adjusting the positioning of the sensor using the motor along the first motion track 206 and second motion track 208. For example, the processor, such as processor 14, may enable dynamic positioning based on a computed signal to noise ratio based on a set of raw signal data corresponding to a biometric signal detected by the sensor. In certain embodiments, the first motion track 206 and the second motion track 208 may permit movement of the sensor (e.g., microphone) towards a user's mouth to capture audio. Due to differences in head shapes, dimensions, and other physical characteristics of a user, the location of the mouth is not uniform amongst all users. As such, the processor of the device 200 may enable dynamic positioning of the sensor adjacent any user's mouth, regardless of physical characteristics, by adjusting the positioning of the sensor using the motor along the first motion track 206 and second motion track 208. For example, the processor, such as processor 14, may enable dynamic positioning based on a computed signal to noise ratio based on a set of raw signal data corresponding to a signal detected by the sensor.

Figure 3A:
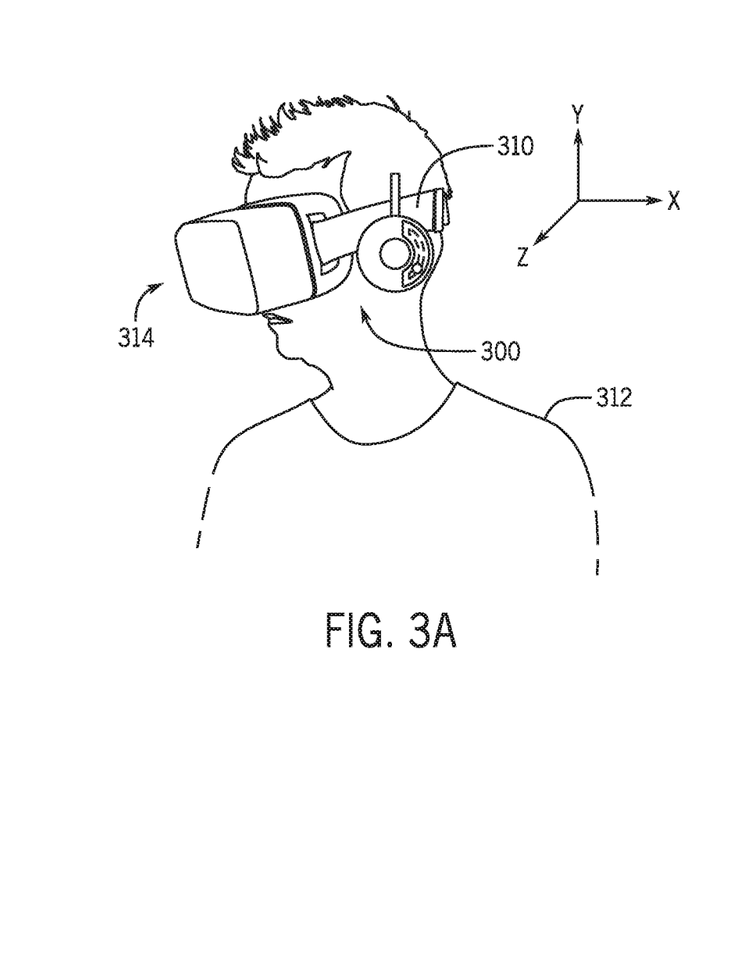
FIGS. 3A and 3B are diagrams of a device incorporating a biometric sensor system on an arcuate track of a corresponding head-mounted display, in accordance with an embodiment of the present disclosure.
Figure 3B:
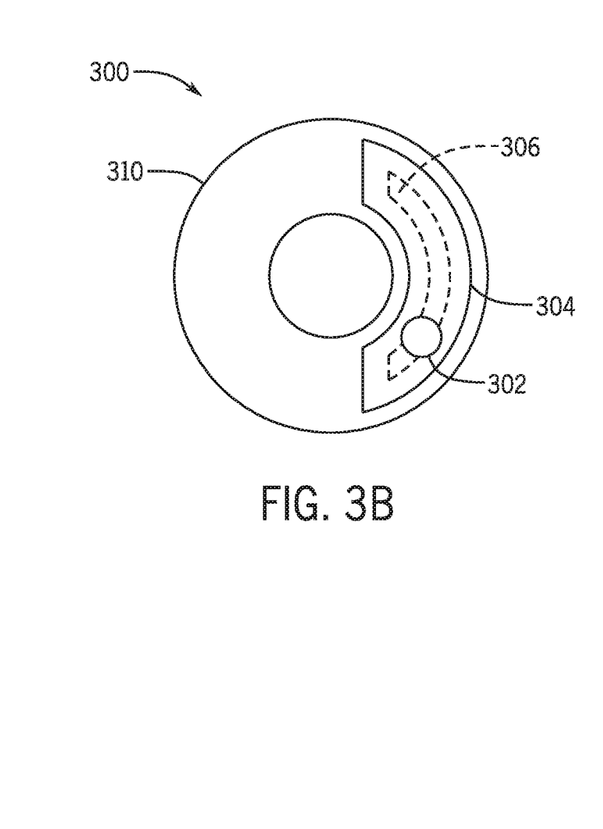

FIGS. 3A and 3B are diagrams of another example of a device 300 incorporating a biometric sensor system, such as biometric sensor system 10 in FIG. 1, having a sensor 302 on an arcuate track, according to embodiments of the present disclosure. To facilitate discussion related to motion of the sensor 302, an illustration of three axes of motion corresponding to three degrees of freedom with respect to movement of the sensor 302 is shown. The three axes of motion (and corresponding degrees of freedom) may be denoted as horizontal motion (e.g., movement along the x-axis anterior and posterior in relation to the user), vertical motion (e.g., movement along the y-axis inferior and superior in relation to the user), and retraction/extension (e.g., movement along the z-axis towards and away from the user). The three degrees of freedom represent only an example embodiment of motion of the sensor 302. In certain embodiments, more or fewer than three degrees of freedom are possible for the motion of the sensor 302. In some embodiments, the sensor 302 may be configured to move in one or more degrees of freedom. For example, the sensor 302 may be configured to move in six degrees of freedom.

The device 300 may include a sensor 302, a housing 304, and a motion track 306. The sensor 302 may be an example of the sensor 18 in FIG. 1. As such, the sensor 302 may detect a biometric signal from a user 312. In some embodiments, the sensor 302 may retract into the housing 304 (e.g., along the z-axis) away from the user 312. For example, the sensor 302 may retract into the housing 304 before and/or during horizontal (e.g., along the x-axis) and/or vertical (e.g., along the y-axis) movement of the sensor 302. The sensor 302 may additionally or alternatively extend toward the user 312 before starting and during a sensing period.

The housing 304 may be disposed on a headset housing 308, for a head-mounted display (HMD) 314. For example, the housing 304 may be coupled to the headset housing 308. The HMD 314 may be a display device worn on the head of a user and including a display optic in front of either one or both eyes of the user. The HMD 314 may display computer-generated imagery, live imagery, or any combination thereof (e.g., a virtual reality headset, an augmented reality headset, a mixed reality headset, etc.). The headset housing 308 may include one or more straps to support the weight of the HMD 314 on the user's 312 head. In an embodiment, the headset housing 308 may be a component of any suitable device benefiting from biometric data acquired by a biometric signal sensor, such as fitness trackers, activity trackers, and other forms of wearable technology. The motion track 306 may also be disposed on the housing 304. The motion track 306 may be a circular motion track. The motion track 306 may guide movement of the sensor 302 in a circular direction.

In an embodiment, the motion track 306 may permit movement of the sensor toward a superficial temporal artery of a user, such as user 22 of FIG. 1. The superficial temporal artery is often located adjacent and anterior to the user's ear. Due to differences in head shapes, dimensions, and other physical characteristics of a user, the location of the superficial temporal artery is not uniform amongst all users. As such, the processor of the device 300 may enable dynamic positioning of the sensor on any user's artery, regardless of physical characteristics, by adjusting the positioning of the sensor using the motor along the motion track 306. For example, the processor, such as processor 14, may enable dynamic positioning based on a computed signal to noise ratio based on a set of raw signal data corresponding to a biometric signal detected by the sensor. In certain embodiments, the motion track 306 may permit movement of the sensor (e.g., microphone) towards a user's mouth to capture audio. Due to differences in head shapes, dimensions, and other physical characteristics of a user, the location of the mouth is not uniform amongst all users. As such, the processor of the device 300 may enable dynamic positioning of the sensor adjacent any user's mouth, regardless of physical characteristics, by adjusting the positioning of the sensor using the motor along the motion track 306. For example, the processor, such as processor 14, may enable dynamic positioning based on a computed signal to noise ratio based on a set of raw signal data corresponding to a signal detected by the sensor.

Figure 4A:
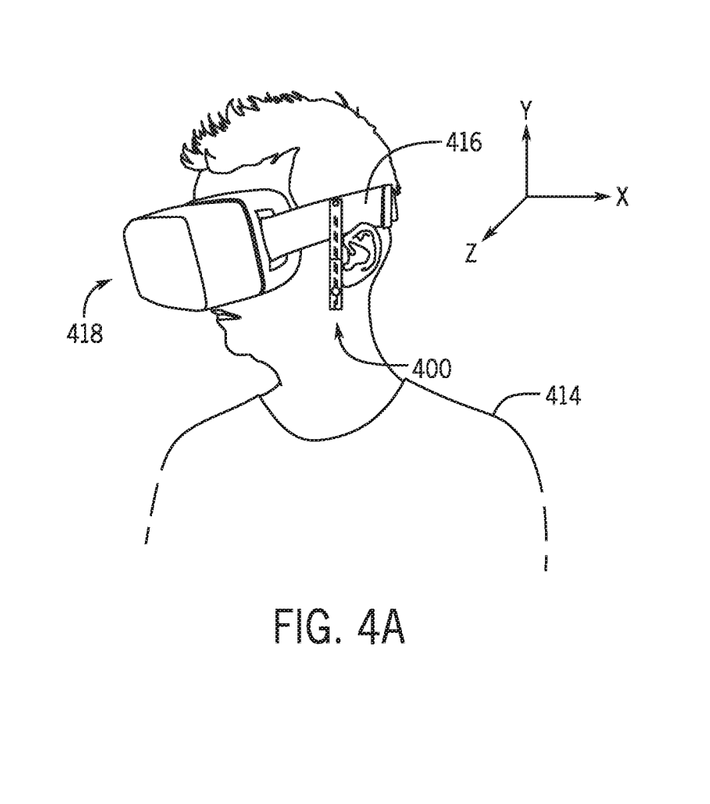
FIGS. 4A and 4B are diagrams of a device incorporating a biometric sensor system on a pivoting track of a corresponding head-mounted display, in accordance with an embodiment of the present disclosure.
Figure 4B:
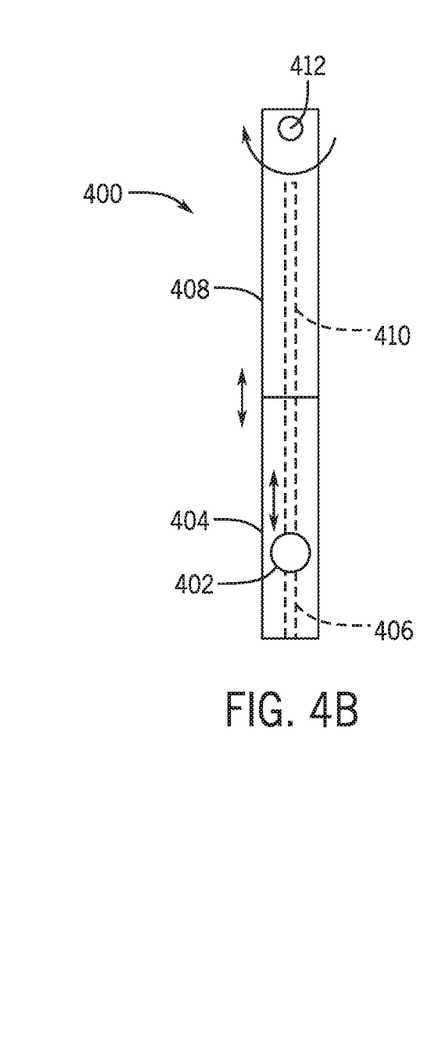

FIGS. 4A and 4B are diagrams of a further example of a device 400 incorporating a biometric sensor system, such as biometric sensor system 10 in FIG. 1, having a sensor 402 on a pivoting track, according to embodiments of the present disclosure. To facilitate discussion related to motion of the sensor 402, an illustration of three axes of motion corresponding to three degrees of freedom with respect to movement of the sensor 402 is shown. The three axes of motion (and corresponding degrees of freedom) may be denoted as horizontal motion (e.g., movement along the x-axis anterior and posterior in relation to the user), vertical motion (e.g., movement along the y-axis inferior and superior in relation to the user), and retraction/extension (e.g., movement along the z-axis towards and away from the user). The three degrees of freedom represent only an example embodiment of motion of the sensor 402. In certain embodiments, more or fewer than three degrees of freedom are possible for the motion of the sensor 402. In some embodiments, the sensor 402 may be configured to move in one or more degrees of freedom. For example, the sensor 402 may be configured to move in six degrees of freedom.

The device 400 may include a sensor 402, a first housing 404, a first motion track 406, a second housing 408, a second motion track 410, and a pivot 412. The sensor 402 may be an example of the sensor 18 in FIG. 1. As such, the sensor 402 may detect a biometric signal from a user 414. In some embodiments, the sensor 402 may retract into the first housing 404. For example, the sensor 402 may retract into the first housing 404 before and/or during movement of the sensor 402. The sensor 402 may additionally or alternatively extend toward a user 414 before starting and during a sensing period.

The first motion track 406 may guide movement of the sensor 402. For example, the first motion track 406 may guide movement of the sensor 402 along an axis of the first housing 404. The first motion track 406 may be disposed on the first housing 404. The first housing 404 may be coupled to the second housing 408. For example, the first housing 404 may be movably coupled to the second housing 408 by the second motion track 410. The second motion track 410 may guide movement of the first housing 404. For example, the second motion track 410 may guide movement of the first housing 404 along an axis of the second housing 408. The second motion track 410 may be disposed on the second housing 408. The pivot 412 may rotate the sensor 402, the first housing 404, and the second housing 408 about an axis through the pivot 412. The pivot 412 may be coupled to a headset housing 416. The pivot 412 may couple the second housing 408 to the headset housing 416.

The headset housing 416 may be a housing for a head-mounted display (HMD) 418. The HMD 418 may be a display device worn on the head of a user and including a display optic in front of either one or both eyes of the user. The HMD 418 may display computer-generated imagery, live imagery, or any combination thereof (e.g., a virtual reality headset, an augmented reality headset, a mixed reality headset, etc.). The headset housing 416 may include one or more straps to support the weight of the HMD 418 on the user's 414 head. In an embodiment, the headset housing 416 may be a component of any suitable device benefiting from biometric data acquired by a biometric signal sensor, such as fitness trackers, activity trackers, and other forms of wearable technology.

In an embodiment, the first motion track 406, the second motion track 410, and the pivot 412 may permit movement of the sensor toward a superficial temporal artery of a user, such as user 22 of FIG. 1. The superficial temporal artery is often located adjacent and anterior to the user's ear. Due to differences in head shapes, dimensions, and other physical characteristics of a user, the location of the superficial temporal artery is not uniform amongst all users. As such, the processor of the device 400 may enable dynamic positioning of the sensor on any user's artery, regardless of physical characteristics, by adjusting the positioning of the sensor using the motor along the first motion track 406, second motion track 410, and pivot 412. For example, the processor, such as processor 14, may enable dynamic positioning based on a computed signal to noise ratio based on a set of raw signal data corresponding to a biometric signal detected by the sensor. In certain embodiments, the first motion track 406, the second motion track 410, and the pivot 412 may permit movement of the sensor (e.g., microphone) towards a user's mouth to capture audio. Due to differences in head shapes, dimensions, and other physical characteristics of a user, the location of the mouth is not uniform amongst all users. As such, the processor of the device 400 may enable dynamic positioning of the sensor adjacent any user's mouth, regardless of physical characteristics, by adjusting the positioning of the sensor using the motor along the first motion track 406, the second motion track 410, and the pivot 412. For example, the processor, such as processor 14, may enable dynamic positioning based on a computed signal to noise ratio based on a set of raw signal data corresponding to a signal detected by the sensor.

Figure 5:
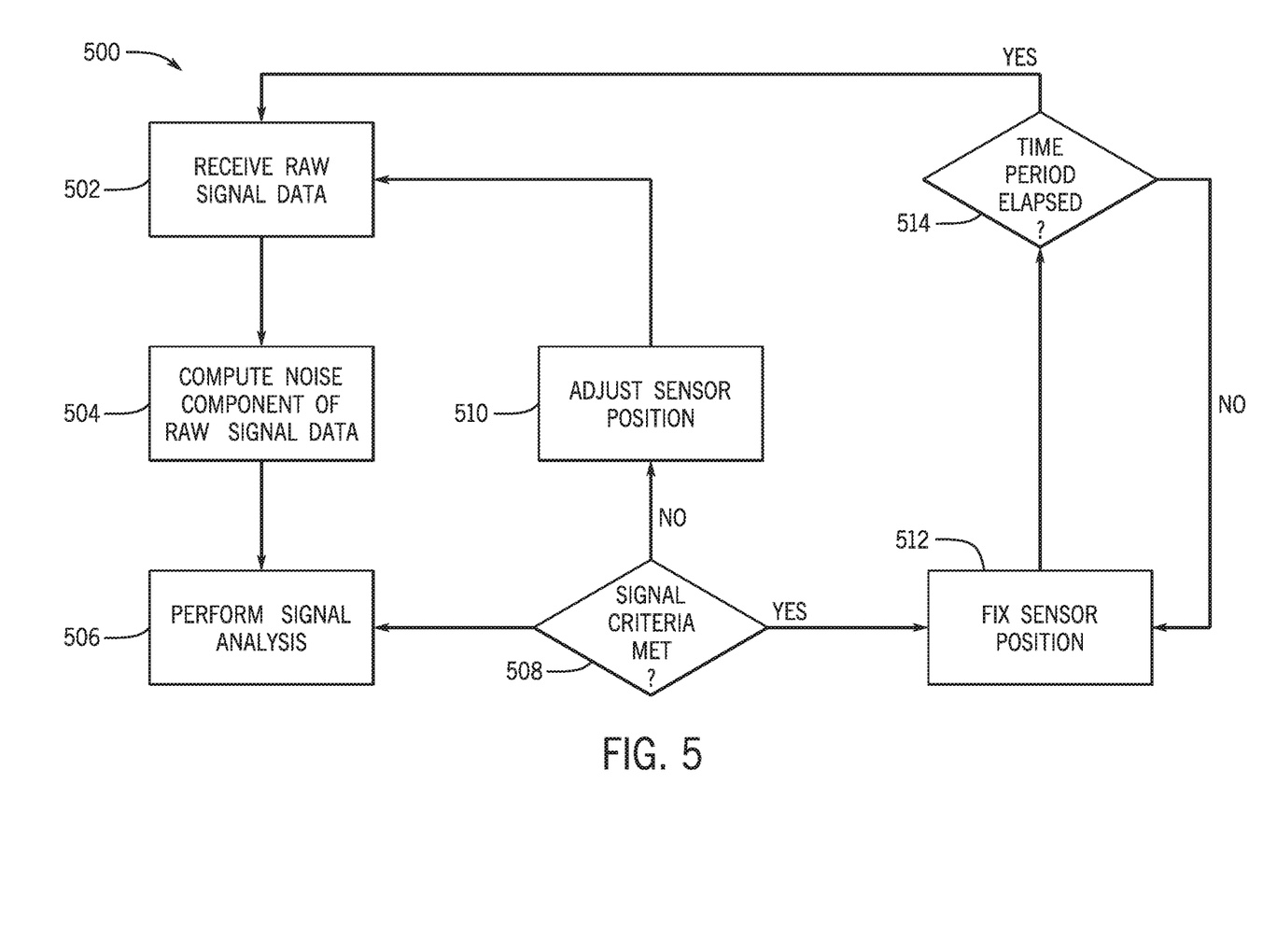
FIG. 5 is a flow diagram of a process for detecting biometric signals and adjusting position of a sensor based on comparing to a signal criteria, in accordance with an embodiment of the present disclosure.

With the preceding in mind, FIG. 5 is a flow diagram of a process 500 for dynamically adjusting position of a sensor based on comparing to a signal criteria, such as the sensor 18 of FIG. 1, to detect biometric signals, according to embodiments of the present disclosure. While the process 500 is described as being performed by the processor 14, it should be understood that the process 500 may be performed by any suitable device that may control and/or communicate with components of the biometric sensor system 10. Furthermore, while the process 500 is described using steps in a specific sequence, it should be understood that the present disclosure contemplates that the described steps may be performed in different sequences than the sequence illustrated, and certain described steps may be skipped or not performed altogether. In some embodiments, the process 500 may be implemented by executing instructions stored in a tangible, non-transitory, computer-readable medium, such as the memory device 16, using any suitable processing circuitry, such as the processor 14.

In this process 500, a set of raw signal data is generated and transmitted, for example, by the sensor 18 of FIG. 1. In some embodiments, the set of raw signal data may be generated by the sensor 18 at an initial position of the sensor. For example, the initial position of the sensor may correspond to a previous position of the sensor from a prior use of the HMD, a position at an end of a motion track, a default position, such as a middle of at least one motion track, a user configured position, such as a position on at least one motion track selected by the user, and a previous position of the sensor corresponding to a previous greater or maximum SNR. The set of raw signal data is received (step 502), for example, at processor 14 of FIG. 1. The set of raw signal data may be used to compute (step 504) a noise component of the raw signal data. For example, the processor 14 may compare the set of raw signal data to a second set of signal data corresponding to a previously filtered and/or expected biometric signal to determine a noise component of the raw signal data. The processor 14 may perform any suitable signal processing or noise filtering algorithm on the raw signal data to filter the raw signal data (e.g., to determine a signal component and the noise component). For example, the processor 14 may perform Fourier transform, wavelet transform, finite impulse response filter, infinite impulse response filter, and adaptive filters, among others, to filter the raw signal data.

The determined noise component may be used to perform signal analysis (step 506) on the set of raw signal data. For example, the processor 14 may compute a signal-to-noise ratio (SNR) for the set of raw signal data. The SNR may include a ratio of a signal component of the raw signal data to a noise component of the raw signal data, which may be expressed as the square of a ratio of the root mean square amplitude of the signal component and the root mean square amplitude of the noise component. The root mean square amplitude is the square root of the mean, or average value. In an embodiment, the processor 14 may compute a root mean square amplitude for a signal component of the raw signal data and a root mean square amplitude for a noise component of the raw signal data.

At step 508, the processor 14 may determine whether at least one signal criteria is met, based on the signal analysis. In one embodiment, a signal criterion may include a threshold SNR. For example, the processor 14 may compare the computed SNR to a threshold SNR stored in memory, such as memory 16 in FIG. 1. In one embodiment, the threshold SNR may be any suitable SNR that provides an accurate determination of the signal component of the raw signal data. For example, the threshold SNR may be at least 10, 15, 20, 25, 30, 40, 50, and so on. The processor 14 may determine the computed SNR meets or exceeds the threshold SNR, and thus meets the at least one signal criteria. In another embodiment, a signal criterion may include exceeding a set of previously computed SNRs. For example, the processor 14 may compare the computed SNR with a set of previously computed SNRs stored in memory 16 of FIG. 1. The processor 14 may determine the computed SNR exceeds the set of previously computed SNRs and meets the at least one signal criteria.

In one embodiment, the processor 14 may compute a set of SNR values, each SNR value corresponding to a different position of a sensor, such as sensor 18 of FIG. 1. The processor 14 may store the set of computed SNR values in memory 16. The processor 14 may compare each SNR value of the set of computed SNR values to the threshold SNR. In one embodiment, the processor 14 may determine that none of the set of SNR values meets or exceeds the threshold SNR. In such a case, the processor 14 may determine a highest value from the set of SNR values (despite the set of SNR values not meeting or exceeding the threshold SNR). In an embodiment, the processor 14 may instruct the motor to move the sensor 18 to the position corresponding to the highest value from the set of SNR values. In response to meeting at least one signal criteria, a position of the sensor is fixed (step 512). For example, the processor 14 may instruct the motor 20 to hold a position of the sensor 18 steady.

The processor 14 may determine an amount of elapsed time from when the signal analysis was performed for the last set of raw signal data. The processor 14 may determine (step 514) whether the amount of elapsed time exceeds a time threshold. The time threshold may be a time period selected by a user, by default, be predetermined, and so on. For example, the time threshold may be between five seconds and thirty minutes, such as twenty seconds, thirty seconds, one minute, five minutes, and so on. If the time threshold has not been exceeded, the sensor stays in the position where the at least one signal criteria was met. The user, such as user 22 of FIG. 1, may shift positions and/or adjust the positioning of an HMD after wearing the HMD for a period of time. As a result, the sensor 18 may adjust the position of the sensor to ensure an accurate biometric signal is obtained from the user 22. If the processor 14 determines the time threshold has been exceeded, the sensor may be activated to generate and transmit a new set of raw signal data to be received (step 502) by the processor.

In an embodiment, the processor 14 may determine that the sensor should be adjusted to ensure accurate biometric signals are obtained from the user 22. In particular, the processor 14 may perform signal processing on the new set of raw signal data to determine whether the sensor 18 should be adjusted. In another embodiment, the biometric sensor system may include a movement sensor, such as an accelerometer. The movement sensor may detect movement of the sensor system 10, for example, adjustment of the HMD by a user. The movement sensor may send a signal to the processor 14 in response to detected movement. In response, the processor 14 may activate the sensor 18 to acquire biometric signal data. In another embodiment, the processor 14 may receive a signal corresponding to powering on and/or powering off the HMD. In response, the processor 14 may activate the sensor 18 to acquire biometric signal data.

If no signal criteria are met at step 508, the processor 14 may instruct a motor, such as motor 20 of FIG. 1, to adjust (step 510) a position of the sensor 18. The processor 14 may then send instructions to activate the sensor 18 to generate and transmit a new set of raw signal data to repeat the process of FIG. 5 at the new position. In this manner, the process 500 enables positioning of a biometric signal sensor, such as sensor 18 of FIG. 1, to acquire accurate biometric signal data based on meeting or exceeding at least one signal criteria.

Figure 6:
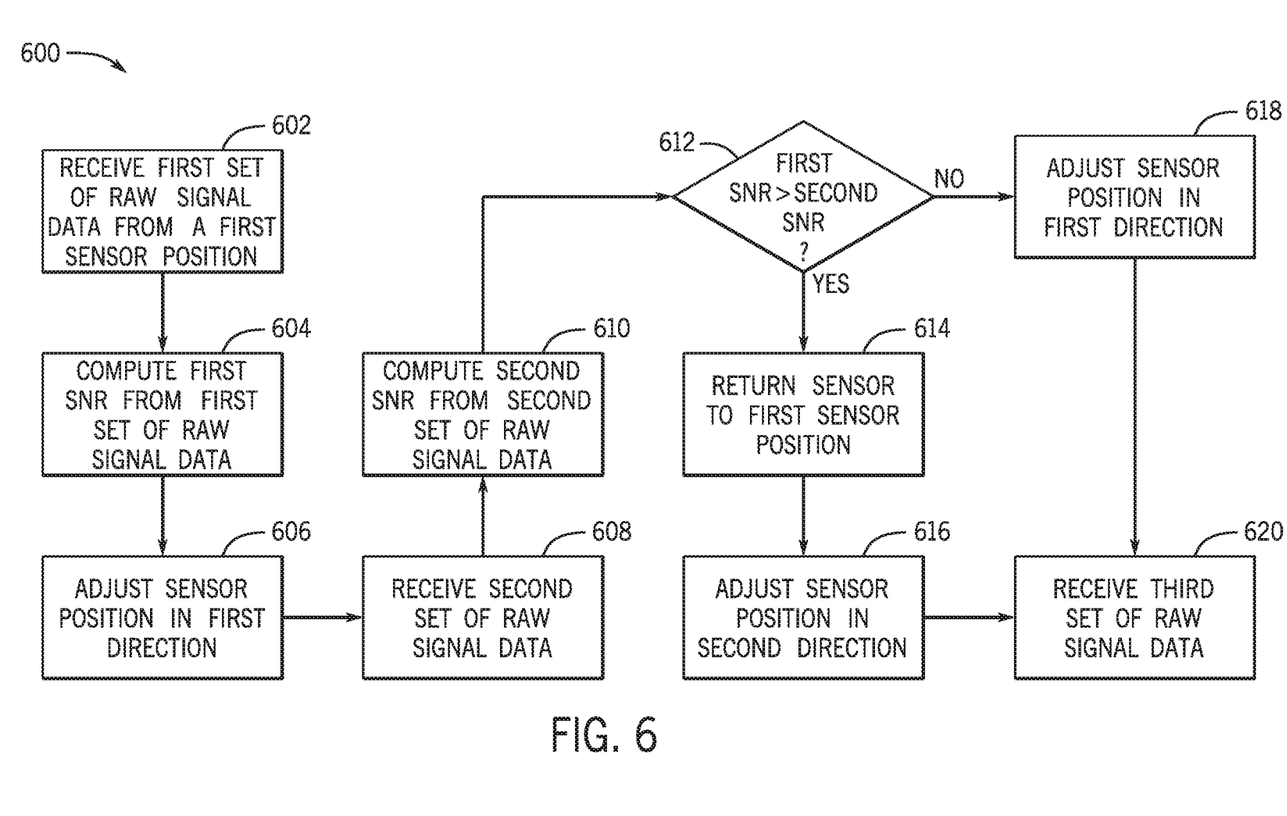
FIG. 6 is a flow diagram of a process for detecting biometric signals and adjusting position of a sensor based on a greater or maximum signal to noise ratio, in accordance with an embodiment of the present disclosure.

With the preceding in mind, FIG. 6 is a flow diagram of a process 600 for dynamically adjusting position of a sensor, such as the sensor 18 of FIG. 1, based on a greater or maximum SNR to detect biometric signals, according to embodiments of the present disclosure. While the process 600 is described as being performed by the processor 14, it should be understood that the process 600 may be performed by any suitable device that may control and/or communicate with components of the biometric sensor system 10. Furthermore, while the process 600 is described using steps in a specific sequence, it should be understood that the present disclosure contemplates that the described steps may be performed in different sequences than the sequence illustrated, and certain described steps may be skipped or not performed altogether. In some embodiments, the process 600 may be implemented by executing instructions stored in a tangible, non-transitory, computer-readable medium, such as the memory device 16, using any suitable processing circuitry, such as the processor 14.

In this process 600, a first set of raw signal data is generated and transmitted at a first sensor position, for example, by the sensor 18 of FIG. 1. In some embodiments, the set of raw signal data may be generated by the sensor 18 at an initial position of the sensor. For example, the initial position of the sensor may correspond to a previous position of the sensor from a prior use of the HMD, a position at an end of a motion track, a default position, such as a middle of at least one motion track, a user configured position, such as a position on at least one motion track selected by the user, or a previous position of the sensor where the SNR was determined to have a previous greater or maximum value. The first set of raw signal data is received (step 602), for example, at processor 14 of FIG. 1. The first set of raw signal data may be used to compute (step 604) a first signal-to-noise ratio (SNR). For example, the processor 14 may compute a root mean square amplitude for a signal component of the first set of raw signal data and a root mean square amplitude for a noise component of the first set of raw signal data to compute the first SNR. At step 606, the processor 14 may instruct a motor, such as motor 20 in FIG. 1, to adjust the sensor position in a first direction (e.g., to a second sensor position).

A second set of raw signal data is generated and transmitted at the second sensor position, for example, by the sensor 18 of FIG. 1. The second set of raw signal data is received (step 608), for example, at processor 14 of FIG. 1. The second set of raw signal data may be used to compute (step 610) a second SNR. For example, the processor 14 may compute a root mean square amplitude for a signal component of the second set of raw signal data and a root mean square amplitude for a noise component of the second set of raw signal data to compute the second SNR.

At step 612, the processor 14 may determine whether the first SNR is greater than the second SNR. A greater SNR indicates a more accurate and/or higher quality biometric signal. If the first SNR is less than or equal to the second SNR (as indicated by the "NO" path of step 612), the processor 14 may instruct the motor 20 to adjust (step 618) the sensor position in the first direction to a third position. A third set of raw signal data is generated and transmitted at the third sensor position, for example, by the sensor 18 of FIG. 1. The third set of raw signal data is received (step 620), for example, at processor 14 of FIG. 1 to repeat the process of FIG. 6 at the third position.

If the first SNR is greater than the second SNR (as indicated by the "YES" path of step 612), the processor 14 may instruct the motor 20 to return (step 614) the sensor to the first sensor position. At step 616, the processor 14 may instruct the motor 20 to adjust the sensor position in a second direction to a third position. In some embodiments, the second direction may be the opposite direction of the first direction, but along the same axis. That is, with respect to FIGS. 2A and 2B, for example, the first direction and the second direction may be in opposite directions along the x-axis. In additional or alternative embodiments, the second direction may be along a different axis from the first direction. With respect to FIGS. 2A and 2B, for example, the first direction may be along the x-axis, while the second direction may be along the y-axis. That is, the first direction may be a horizontal direction and the second direction may be a vertical direction, or vice versa. A third set of raw signal data is generated and transmitted at the third sensor position, for example, by the sensor 18 of FIG. 1. The third set of raw signal data is received (step 620), for example, at processor 14 of FIG. 1 to repeat the process of FIG. 6 at the third position. The process 600 may end when the SNR corresponding to a first position equals or exceeds the SNRs corresponding to a second position in a first direction and a third position in a second direction. In this manner, the process 600 enables positioning of a biometric signal sensor, such as sensor 18 of FIG. 1, to acquire accurate biometric signal data, more specifically, determining a greater or maximum SNR for a set of SNRs, each SNR corresponding to a sensor position of a set of sensor positions. In some embodiments, the process 600 may be used in combination with the process 500 of FIG. 5. For example, the process 600 may be used when no signal criteria are met using the process 500.

In certain embodiments, processes 500, 600 may include additional steps. In some embodiments, the processor, such as processor 14, may send instructions to modify content displayed by the HMD display in response to receiving the biometric signal data. For example, the processor 14 may send instructions to turn off the HMD display in response to receiving no biometric signal data, such as when a user removes the HMD device from their head. As another example, the processor 14 may send instructions to pause playback on the HMD display in response to receiving no biometric signal data to ensure the HMD is positioned on the head during all playback on the HMD display. As another example, the processor 14 may send instructions to adjust brightness, contrast, resolution, sharpness, and/or other display properties in response to receiving the biometric signal data. As yet another example, the processor 14 may send instructions alter content of the HMD display in response to receiving the biometric signal data.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A head-mounted display device, comprising:
   a display unit;
   a sensor configured to receive a biometric signal, the biometric signal comprising one or more sets of biometric signal data, each set of biometric signal data corresponding to a different position of the sensor;
   a housing configured to enable the sensor to retract into the housing along a first axis of motion;
   a motion track disposed on the housing, wherein the motion track is configured to guide movement of the sensor along a second axis of motion and a third axis of motion;
   a motor configured to move the sensor along the first axis of motion, the second axis of motion, and the third axis of motion as provided by the housing and the motion track; and
   a processor communicatively coupled to the sensor and the motor and configured to:
      compute a noise component for each of the one or more sets of biometric signal data;
      compute a set of signal-to-noise ratios (SNRs) for each of the one or more sets of raw biometric signal data; and
      determine, based on computing the set of SNRs, a position for the sensor, the position corresponding to a greater or maximum SNR from the set of SNRs.

2. The head-mounted display device of claim 1, comprising
   a headset housing, wherein the housing is coupled to the headset housing.

3. The head-mounted display device of claim 1, wherein the biometric signal comprises a pulse from a temporal artery.

4. The head-mounted display device of claim 1, wherein the processor is configured to instruct the motor to move the sensor to one or more positions, each position of the one or more positions corresponding to a set of biometric signal data of the one or more sets of biometric signal data.

5. A method for positioning a sensor configured to receive biometric signals, comprising:

receiving a biometric signal using a biometric sensor at a first position, the biometric signal comprising a set of raw biometric signal data;
computing a noise component of the biometric signal;
performing signal analysis on the biometric signal;
determining, based on the signal analysis, that no criteria are met;
in response to determining that no signal criteria are met:
retracting, via a motor, the biometric sensor to a retracted position, wherein the biometric sensor is disposed in a housing;
moving, via the motor, the biometric sensor from the first position to a second position in a first direction along a motion track configured to guide movement of the biometric sensor, wherein the biometric sensor is in the retracted position during movement;
receiving a second biometric signal using the biometric sensor at the second position;
performing a second signal analysis on the second biometric signal;
determining, based on the second signal analysis, that at least one signal criteria is met; and
in response to determining that the at least one signal criteria is met, moving, via the motor, the biometric sensor to a third position, wherein the biometric sensor is moved in a second direction.

6. The method of claim 5, wherein performing the signal analysis comprises computing a signal to noise ratio (SNR) of the biometric signal.

7. The method of claim 6, wherein the at least one signal criteria includes a lesser or minimum threshold SNR.

8. The method of claim 5, comprising:
detecting a set of biometric signals using the biometric sensor at a series of positions, each of the set of biometric signals comprising a set of raw biometric signal data;
computing a set of noise components for the set of biometric signals;
computing a set of SNR ratios for the set of biometric signals;
determining, based on the set of SNR ratios, a third position corresponding to a greater or maximum SNR ratio for the set of biometric signals; and
moving the biometric sensor to the third position.

9. The method of claim 5, comprising:
determining a threshold time period has elapsed since the signal analysis; and
detecting a third biometric signal using the biometric sensor at the first position.

10. The method of claim 9, comprising:
performing a third signal analysis on the third biometric signal;
determining, based on the third signal analysis, whether the at least one signal criteria is met; and
fixing, based on the determination that the at least one signal criteria is met, the biometric sensor in the first position.

11. The method of claim 5, wherein the biometric signal comprises a pulse from a temporal artery.

12. The method of claim 5, comprising:
receiving a third biometric signal at the third position;
performing a third signal analysis on the third biometric signal;
determining, based on the third signal analysis, that the at least one signal criteria is met; and
in response to determining that the at least one signal criteria is met, fixing the sensor at the third position.

13. A system for biometric sensing, comprising:
a sensor configured to receive a biometric signal at a first position, the biometric signal comprising a set of raw biometric signal data;
a housing, wherein the sensor is configured to retract into the housing;
a motion track disposed on the housing, wherein the motion track is configured to guide movement of the sensor;
a motor configured to extend and retract the sensor out of and into the housing and move the sensor along the motion track; and
a processor communicatively coupled to the sensor and the motor and configured to:
compute a noise component of the biometric signal;
perform signal analysis on the biometric signal; and
determine, based on the signal analysis, whether at least one signal criteria are met.

14. The system of claim 13, wherein the processor is configured to move, in response to determining that no signal criteria are met, the sensor from a first position to a second position.

15. The system of claim 13, wherein the processor is configured to compute a signal to noise ratio (SNR) of the biometric signal.

16. The system of claim 15, wherein the at least one signal criteria includes a lesser or minimum threshold SNR.

17. The system of claim 13, wherein the sensor is configured to detect a set of biometric signals at a series of positions, each of the set of biometric signals comprising a set of raw biometric signal data; and
wherein the processor is configured to:
compute a set of noise components for the set of biometric signals;
compute a set of SNR ratios for the set of biometric signals; and
determine, based on the set of SNR ratios, a third position corresponding to a greater or maximum SNR for the set of biometric signals.

18. The system of claim 13, wherein the processor is configured to:
determine a threshold time period has elapsed since the signal analysis; and
detect a second biometric signal using the biometric sensor at the first position.

19. The system of claim 18, wherein the processor is configured to:
perform a second signal analysis on the biometric signal; and
determine, based on the second signal analysis, whether the at least one signal criteria is met.

20. The system of claim 13, wherein the processor is configured to instruct the motor to move the sensor in at least three degrees of freedom by extending the sensor out of the housing, retracting the sensor into the housing, moving the sensor along the motion track, or any combination thereof.

* * * * *